United States Patent
Kazuno et al.

(10) Patent No.: US 9,796,270 B2
(45) Date of Patent: Oct. 24, 2017

(54) POWER SUPPLY SYSTEM AND FUEL CELL VEHICLE

(71) Applicant: HONDA MOTOR CO., LTD., Tokyo (JP)

(72) Inventors: Shuichi Kazuno, Wako (JP); Kenichi Shimizu, Wako (JP); Yasutaka Sakai, Wako (JP); Takuya Shirasaka, Wako (JP); Kosuke Higashitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 329 days.

(21) Appl. No.: 14/731,410

(22) Filed: Jun. 5, 2015

(65) Prior Publication Data

US 2016/0001675 A1 Jan. 7, 2016

(30) Foreign Application Priority Data

Jul. 3, 2014 (JP) ................. 2014-137575

(51) Int. Cl.
| | |
|---|---|
| *B60L 1/00* | (2006.01) |
| *B60L 11/18* | (2006.01) |
| *H01M 10/48* | (2006.01) |
| *H01M 16/00* | (2006.01) |
| *H01M 8/04537* | (2016.01) |
| *H02J 7/00* | (2006.01) |

(52) U.S. Cl.
CPC ............ *B60L 1/00* (2013.01); *B60L 11/1883* (2013.01); *B60L 11/1887* (2013.01); *H01M 8/04559* (2013.01); *H01M 10/48* (2013.01); *H01M 16/006* (2013.01); *B60L 2210/14* (2013.01); *B60L 2240/527* (2013.01); *B60L 2240/547* (2013.01); *B60L 2240/549* (2013.01); *H01M 2220/20* (2013.01); *H01M 2250/20* (2013.01); *Y02T 10/7225* (2013.01); *Y02T 10/92* (2013.01); *Y02T 90/32* (2013.01); *Y02T 90/34* (2013.01)

(58) Field of Classification Search
CPC .... H01M 2250/20; Y02T 10/92; Y02T 90/32; H02J 7/00; H02P 1/54
USPC ........................................... 307/9.1
See application file for complete search history.

(56) References Cited

U.S. PATENT DOCUMENTS 7,436,148 B2  10/2008  Saeki et al.

FOREIGN PATENT DOCUMENTS

JP    2005-348530    12/2005

*Primary Examiner* — Robert Deberadinis
(74) *Attorney, Agent, or Firm* — Mori & Ward, LLP (57) ABSTRACT

A power supply system includes a fuel cell, a power storage device, a first voltage adjusting device, a second voltage adjusting device, and a controller. The controller is to control the first voltage adjusting device and the second voltage adjusting device. The controller is to switch the second voltage adjusting device from a direct coupling state to a voltage adjusting state in a case where a first absolute value of a first difference between a secondary voltage of the second voltage adjusting device applied across a load and a fuel cell voltage is less than a predetermined allowable voltage value or in a case where a second absolute value of a second difference between a fuel cell current being to flow from the fuel cell into the first voltage adjusting device and a target current value of the fuel cell current exceeds a predetermined allowable current value.

15 Claims, 6 Drawing Sheets

POWER SUPPLY SYSTEM AND FUEL CELL VEHICLE

CROSS-REFERENCE TO RELATED APPLICATIONS

The present application claims priority under 35 U.S.C. §119 to Japanese Patent Application No. 2014-137575, filed Jul. 3, 2014, entitled "Power Supply System and Fuel Cell Vehicle." The contents of this application are incorporated herein by reference in their entirety.

BACKGROUND

1. Field

The present disclosure relates to a power supply system and a fuel cell vehicle.

2. Description of the Related Art

Japanese Unexamined Patent Application Publication No. 2005-348530, for example, describes a fuel cell vehicle including a power supply system in which a fuel cell is connected to a load through a first voltage adjusting device and a power storage device is connected to the load through a second voltage adjusting device so that the load is driven by the fuel cell and the power storage device.

SUMMARY

According to one aspect of the present invention, a power supply system includes a fuel cell, a power storage device, a load, a first voltage adjusting device, a second voltage adjusting device and a controller. The fuel cell outputs a fuel cell voltage. The power storage device outputs a power storage device voltage. The first voltage adjusting device adjusts the fuel cell voltage and applies the adjusted fuel cell voltage to the load. The second voltage adjusting device adjusts the power storage device voltage and applies the adjusted power storage device voltage to the load. The controller controls the first voltage adjusting device and the second voltage adjusting device. When an absolute value of a difference between a secondary voltage at the load in the second voltage adjusting device and the fuel cell voltage is less than a predetermined allowable voltage value or when an absolute value of a difference between a fuel cell current flowing from the fuel cell into the first voltage adjusting device and a command value of the fuel cell current exceeds a predetermined allowable current value, the controller switches the second voltage adjusting device from a direct coupling state to a voltage adjusting state.

According to another aspect of the present invention, a fuel cell vehicle includes the power supply system and a driving motor included in the load of the power supply system.

According to further aspect of the present invention, a power supply system includes a fuel cell, a power storage device, a first voltage adjusting device, a second voltage adjusting device, and a controller. The fuel cell is to output a fuel cell voltage. The power storage device is to output a power storage device voltage. The first voltage adjusting device is to adjust the fuel cell voltage to generate an adjusted fuel cell voltage to be applied to a load. The second voltage adjusting device has a direct coupling state and a voltage adjusting state. The power storage device voltage is adjusted to generate an adjusted power storage device voltage to be applied to the load in the voltage adjusting state. The power storage device voltage is applied to the load without adjusting the power storage device voltage in the direct coupling state. The controller is to control the first voltage adjusting device and the second voltage adjusting device. The controller is to switch the second voltage adjusting device from the direct coupling state to the voltage adjusting state in a case where a first absolute value of a first difference between a secondary voltage of the second voltage adjusting device applied across the load and the fuel cell voltage is less than a predetermined allowable voltage value or in a case where a second absolute value of a second difference between a fuel cell current being to flow from the fuel cell into the first voltage adjusting device and a target current value of the fuel cell current exceeds a predetermined allowable current value.

According to the other aspect of the present invention, a fuel cell vehicle includes the power supply system and a driving motor included in the load of the power supply system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

With reference to FIGS. 1 to 7, a power supply system and a fuel cell vehicle according to a embodiment of the present disclosure will be specifically described.

[Schematic Overall Configurations of Fuel Cell Vehicle 10 and Fuel Cell System 12]

Figure 1:
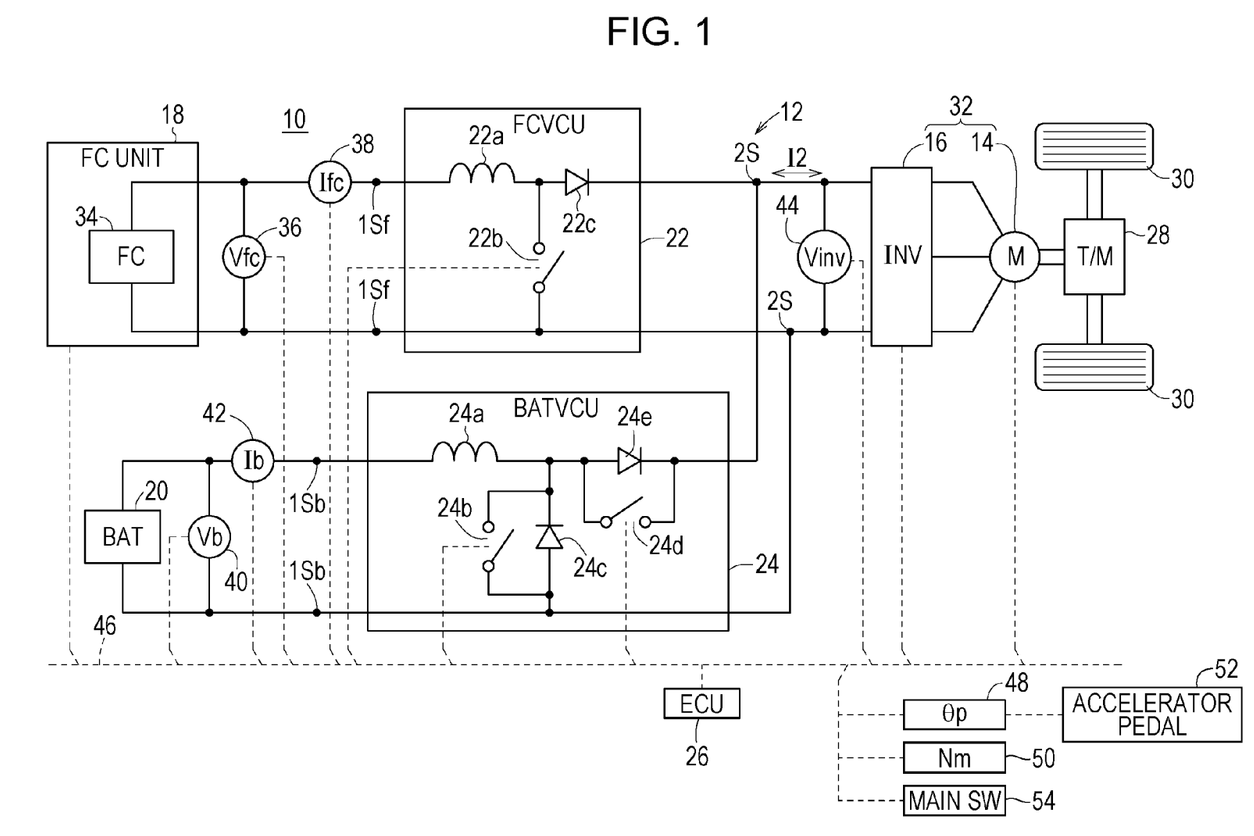
FIG. 1 schematically illustrates an overall configuration of an FC vehicle to which an FC system according to an embodiment is applied.

FIG. 1 schematically illustrates an overall configuration of a fuel cell vehicle 10 (hereinafter also referred to as an "FC vehicle 10") according to this embodiment. A fuel cell system 12 (hereinafter also referred to as an "FC system 12") is applied to the FC vehicle 10.

The FC vehicle 10 includes the FC system 12 that is a power supply system, a driving motor 14 (hereinafter also referred to as a "motor 14"), and a load driving' circuit 16 (hereinafter also referred to as an "inverter (INV) 16").

The FC system 12 basically includes a fuel cell unit 18 (hereinafter also referred to as an "FC unit 18") disposed at a primary side 1Sf, a high-voltage battery 20 (hereinafter also referred to as a "BAT 20" disposed at the other primary side 1Sb, a boost converter 22 (hereinafter also referred to as a "FC voltage control unit (FCVCU) 22" disposed between the primary side 1Sf and the secondary side 2S, a buck-boost converter 24 (hereinafter also referred to as a "BATVCU 24") disposed between the primary side 1Sb and the secondary side 2S, and an electric control unit 26 (hereinafter also referred to as an "ECU 26"). The BATVCU 24 may be a boost converter.

The motor 14 generates a driving force based on power supplied from the FC unit 18 and the BAT 20, and rotates wheels 30 through a transmission 28 by using the driving force.

The INV 16 has a three-phase bridge configuration, performs DC to AC conversion, specifically converts a load driving circuit input terminal voltage Vinv [V] (hereinafter also referred to as a "load terminal voltage Vinv"), which is a DC voltage, into a three-phase AC voltage, and supplies the three-phase AC voltage to the motor 14. The INV 16 also supplies a load terminal voltage Vinv after AC to DC conversion due to regenerative operation of the motor 14 to the BAT 20 (i.e., charges the BAT 20) through the BATVCU 24.

In this embodiment, the motor 14 uses a permanent magnet synchronous motor (a PM motor). In order to increase the number of revolutions of the motor 14 with a predetermined torque, a field-weakening control may be applied.

The motor 14 and the INV 16 will be collectively referred to as a load 32. In application, the load 32 may include components of the FC vehicle 10, such as the BATVCU 24, in addition to the motor 14, for example.

The FC unit 18 includes an FC 34. The FC 34 has, for example, a configuration as a stack of fuel cells in which a solid polymer electrolyte film is sandwiched between an anode electrode and a cathode electrode.

In this case, when hydrogen is supplied to the anode electrode, hydrogen is changed into hydrogen ions on an electrode catalyst, and the hydrogen ions move to the cathode electrode through the electrolyte film. Electrons generated during the movement are taken out to an external circuit so that a DC voltage Vfc (hereinafter also referred to as an "FC power generation voltage Vfc") that is a fuel cell voltage is generated and used as electric energy.

On the other hand, an oxidant gas is supplied to the cathode electrode. Thus, in the cathode electrode, hydrogen ions, electrons, and an oxygen gas react so that water is generated. A system for supplying and exhausting hydrogen and an oxidant gas to/from the FC 34 is known, and thus, is not specifically described here.

Power generated by the FC 34 (hereinafter also referred to as FC generated power Pfc where Pfc=Vfc×Ifc, Ifc: FC generated current) is supplied to the INV 16 and the motor 14 serving as the load 32 by boosting the FC power generation voltage Vfc by the FCVCU 22 serving as the first voltage adjusting device or by setting the FCVCU 22 in the direct coupling state (during powering).

The FC generated power Pfc as the fuel cell power is supplied to auxiliaries (not shown) through the BATVCU 24 serving as the second voltage adjusting device in accordance with a power state of the FC system 12. In addition, the FC generated power Pfc is supplied to the BAT 20 for charging through the BATVCU 24 in accordance with the power state of the FC system 12. Furthermore, the FC generated power Pfc is supplied to, for example, the ECU 26 and auxiliaries driven at low voltages such as sensors through the BATVCU 24 and a buck converter (not shown) in accordance with a power state of the FC system 12.

On the other hand, power from the BAT 20 (hereinafter also referred to as BAT power Pbat) is supplied to the INV 16 and the motor 14 by boosting a battery voltage Vb by the BATVCU 24 or setting the BATVCU 24 in the direct coupling state (during powering). The BAT power Pbat is supplied to auxiliaries (not shown) and to, for example, a low-voltage battery through the buck converter, in accordance with the power state of the FC system 12. Power from the low-voltage battery is supplied to, for example, the ECU 26 and auxiliaries.

The BAT 20 is a power storage device (an energy storage) including plurality of battery cells, and may be a lithium-ion secondary battery, a nickel-hydrogen secondary battery, or a capacitor, for example. In this embodiment, the lithium ions secondary battery is used.

As schematically illustrated in FIG. 1, the FCVCU 22 includes an inductor 22a, a switching element 22b, and a diode 22c. When the switching element 22b is changed to a switching stage (a duty control) through the ECU 26, the FCVCU 22 boosts the FC power generation voltage Vfc to a load terminal voltage Vinv as a secondary voltage.

When the switching element 22b is maintained in an off state (is kept open), i.e., the switching element 22b performs no switching operation, the FC 34 and the load 32 are directly coupled to each other through the inductor 22a and the diode 22c so that the load terminal voltage Vinv is directly coupled to the FC power generation voltage Vfc (where Vinv=Vfc−Vd≈Vfc, Vd<Vfc, Vd is a forward dropped voltage of the diode 22c). In this case, the diode 22c operates to boost the voltage or establish direct coupling and to prevent backflow. Thus, the FCVCU 22 performs a backflow prevention operation and a direct coupling operation (e.g., during powering) in addition to a boost operation (e.g., during powering).

On the other hand, the BATVCU 24 includes an inductor 24a, switching elements 24b and 24d, and diodes 24c and 24e connected in parallel to the switching elements 24b and 24d, respectively. In this case, in boosting, the ECU 26 turns the switching element 24d off, and the switching element 24b is switched (a duty control) so that the battery voltage Vb (the power storage device voltage) is boosted to the load terminal voltage Vinv as the secondary voltage (during powering).

On the other hand, in bucking, the ECU 26 turns the switching element 24b off and switches the switching element 24d (a duty control) so that the load terminal voltage Vinv is bucked to a battery voltage Vb of the BAT 20 (during regenerative charging or charging by the FC 34). The BAT 20 and the load 32 are set in a direct coupling state (hereinafter referred to as a BAT direct coupling state during powering, charging, or driving of, for example, an auxiliary load) by turning the switching element 24b off and the switching element 24d on.

In the BAT direct coupling state, the battery voltage Vb of the BAT 20 reaches the load terminal voltage Vinv (Vb=Vinv). In application, the load terminal voltage Vinv during powering by the BAT 20 in the BAT direct coupling state is a "forward dropped voltage of the Vb−diode 24e," and the load terminal voltage Vinv during charging (including regeneration) is a "Vinv=Vb+on-voltage of switching element 24d=Vb (suppose that the on-voltage of the switching element 24d is 0 [V])."

In the FCVCU 22 and the BATVCU 24 illustrated in FIG. 1, a smoothing capacitor disposed between the primary sides 1Sf and 1Sb and the secondary side 2S is not shown.

The FC 34 has known current-voltage characteristics (IV characteristics) in which the FC generated current Ifc as an output current increases as the FC power generation voltage Vfc decreases from an FC open end voltage Vfcocv.

Thus, in direct coupling of the FCVCU 22, the FC power generation voltage Vfc of the FC 34 is controlled by using a load terminal voltage Vinv, which is a command voltage (a target voltage) of the BATVCU 24, determined based on the boost ratio (Vinv/Vb) of the BATVCU 24 in a boost state (a switching state). Thus, when the FC power generation voltage Vfc is determined, an FC generated current Ifc is controlled (determined) in accordance with the IV characteristics.

In boosting the FCVCU 22, the voltage of the primary side 1Sf of the FCVCU 22, i.e., the FC power generation voltage Vfc, is a command voltage (a target voltage) of the FCVCU 22, and the FC generated current Ifc is determined in accordance with the IV characteristics. Thus, a boost ratio (Vinv/Vfc) of the FCVCU 22 is determined such that a desired load terminal voltage Vinv can be obtained.

In the direct coupling state of the BATVCU 24 during regeneration, the FC power generation voltage Vfc of the FC 34 is the command voltage (the target voltage) of the FCVCU 22. Thus, the boost ratio (Vinv/Vfc) of the FCVCU 22 is determined so as to change in accordance with a change in the load terminal voltage Vinv, and the FC generated current Ifc is controlled (determined) in accordance with the IV characteristics.

In addition, in the direct coupling state of the BATVCU 24 during powering, the FC power generation voltage Vfc of the FC 34 is the command voltage (the target voltage) of the FCVCU 22. Thus, the boost ratio (Vinv/Vfc) of the FCVCU 22 is determined so as to change in accordance with a change in the load terminal voltage Vinv, and the FC generated current Ifc is controlled (determined).

The possibility of simultaneous direct coupling state of the FCVCU 22 and the BATVCU 24 is preferably minimized because this state might disable control of the load terminal voltage Vinv by adjusting the FC power generation voltage Vfc and the battery voltage Vb or degrade or damage the FC 34 and the BAT 20.

In this embodiment, during powering in which motor required power Pmotreq is positive, the FCVCU 22 is set in the direct coupling state, and the load terminal voltage Vinv that is the FC power generation voltage Vfc serves as a load terminal command voltage Vinvcom that is a command voltage (a target voltage) of the BATVCU 24. In this case, the load terminal command voltage Vinvcom decreases as the motor required power Pmotreq increases in the positive direction. In other words, a decrease in the FC power generation voltage Vfc increases the FC generated current Ifc (increases the FC generated power Pfc), the FC generated current Ifc is supplied to the driving motor 14 through the INV 16, the BAT 20 is charged through the BATVCU 24, and the FC generated current Ifc is supplied to auxiliaries.

During regeneration in which the motor required power Pmotreq is negative, in order to take regenerated power in the BAT 20 as much as possible (to maximize the charged amount), the FC power generation voltage Vfc is set at a relatively high power generation voltage that is constant and used for generating a relatively small FC generated current Ifc. In this case, if the battery voltage Vb is less than or equal to the FC power generation voltage Vfc (Vb≤Vfc), a target voltage (a secondary side voltage) of the BATVCU 24 is a load terminal command voltage Vinvcom and fixed at the FC power generation voltage Vfc.

On the other hand, during regeneration in which the motor required power Pmotreq is negative, if the battery voltage Vb exceeds the FC power generation voltage Vfc (Vb>Vfc), the BATVCU 24 transitions from the switching state to the direct coupling state of the BATVCU 24 in order to take regenerated power into the BAT 20 as much as possible (maximize the charged amount), and then the load terminal command voltage Vinvcom serves as the battery voltage Vb, and the battery voltage Vb gradually increases with charging of the regenerated power.

In synchronization of the transition of the BATVCU 24 from the switching state to the direct coupling state of the BATVCU 24, the FCVCU 22 transitions from the direct coupling state to the switching state, and this secondary side voltage control in the switching state of the FCVCU 22 increases the load terminal command voltage Vinvcom, and in accordance with this increase, the battery voltage Vb sequentially increases.

The FC power generation voltage Vfc is detected by a voltage sensor 36, and the FC generated current Ifc is detected by a current sensor 38. The battery voltage Vb is detected by a voltage sensor 40, and a battery current Ib is detected by the current sensor 42. The load terminal voltage Vinv is detected by a voltage sensor 44.

The ECU 26 controls the motor 14, the INV 16, the FC unit 18, the BAT 20, the FCVCU 22, and the BATVCU 24 through a communication line 46. Through the communication line 46, the ECU 26 receives the FC power generation voltage Vfc detected by the voltage sensor 36, the FC generated current Ifc detected by the current sensor 38, the battery voltage Vb detected by the voltage sensor 40, the battery current Ib detected by the current sensor 42, and the load terminal voltage Vinv detected by the voltage sensor 44.

In the control described above, the ECU 26 executes a program stored in a memory (a ROM), not shown, and uses detected values obtained by the sensors, such as the FC power generation voltage Vfc, the FC generated current Ifc, the battery voltage Vb, the battery current Ib, the load terminal voltage Vinv, the secondary current I2, and motor current Im.

The sensors include an opening degree sensor 48 and a motor revolution number sensor 50 in addition to the voltage sensors 36, 40, and 44 and the current sensors 38 and 42 described above. The opening degree sensor 48 detects the opening degree θp [deg] of the accelerator pedal 52. The motor revolution number sensor 50 detects the number of revolutions of the motor 14 (hereinafter referred to as a "motor revolution number Nm" or "the number of revolutions Nm") [rpm]. Thus, the ECU 26 can detect the vehicle velocity V [km/h] of the FC vehicle 10 based on the number of revolutions Nm. Although the motor revolution number sensor 50 also serves as a vehicle velocity sensor, this vehicle velocity sensor may be additionally provided.

The ECU 26 is connected to a main switch 54 (hereinafter referred to as a "main SW 54"). The main SW 54 corresponds to an ignition switch of an internal combustion automobile, switches power supply from the FC unit 18 and the BAT 20 to the motor 14 between on or off, and can be operated by a user. When the main SW 54 is turned on, the FC 34 comes to be in a power generation state. When the main SW 54 is turned on, the FC 34 comes to be in a power generation stop state.

The ECU 26 is a computer including a microcomputer and includes, for example, a central processing unit (a CPU), a ROM (including an EEPROM) serving as a memory, a random-access memory (a RAM), other input/output devices such as an A/D converter and a D/A converter, a timer that is a time-measuring device. The ECU 26 functions as various function-achieving devices (function-achieving units) such as a controller, a calculator, and a processor when the CPU reads and executes a program recorded on a ROM. The ECU 26 is not necessarily composed of a single ECU, and may be composed of plurality of ECUs respectively associated with the motor 14, the FC unit 18, the BAT 20, the FCVCU 22, and the BATVCU 24.

The ECU 26 determines distribution (shares) of a load that should be placed on the FC 34, a load that should be placed on the BAT 20, a load that should be placed on the regenerative power supply (the motor 14) while arbitrating among these loads, from a load required for the FC system 12 as the whole FC vehicle 10 based on inputs (load requests) from the switches and the sensors in addition to the state of the FC 34, the state of the BAT 20, the state of the motor 14, and issues instructions to the motor 14, the INV 16, the FC unit 18, the BAT 20, the FCVCU 22, and the BATVCU 24.

[Control over FC system 12 by ECU 26]

The FC vehicle 10 and the FC system 12 of this embodiment have the following configurations.

Figure 2:
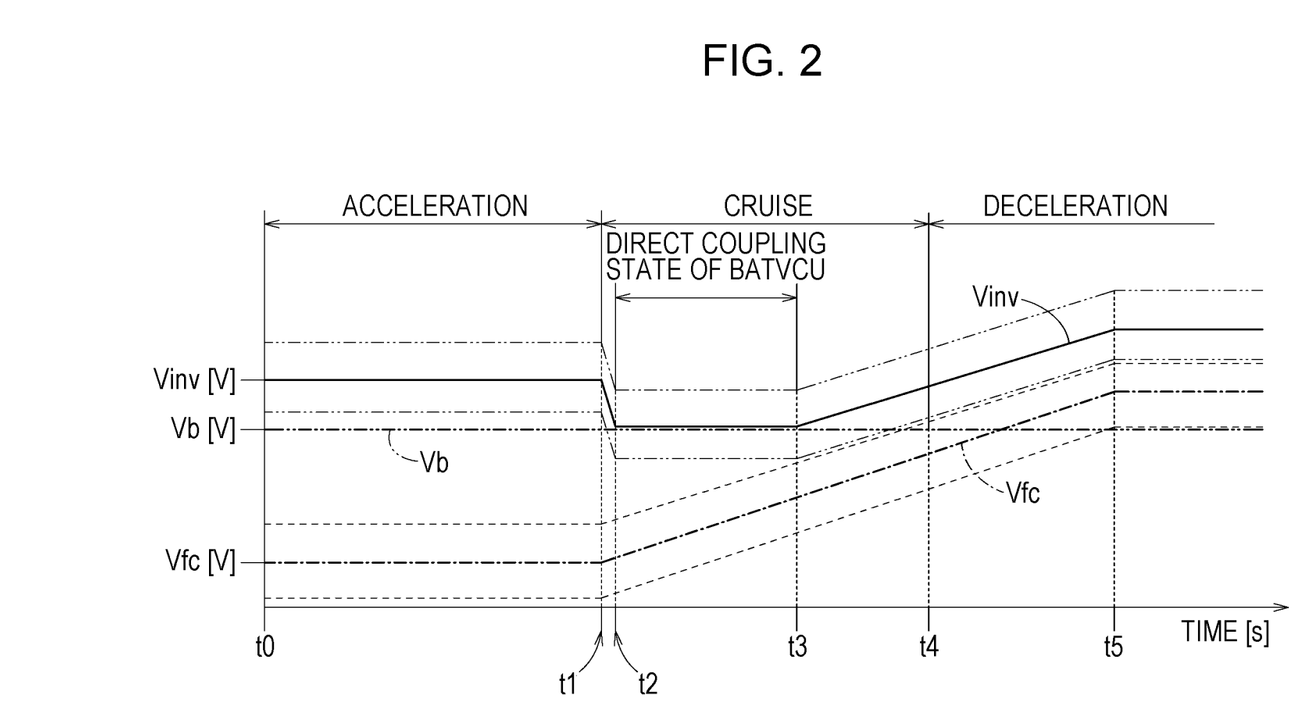
FIG. 2 is a timing chart of an operation (a first example) of the embodiment.

Examples (a first example and a second example) of operations of the FC vehicle 10 and the FC system 12 will be described with reference to FIGS. 2 through 7. In the following description, FIG. 1 will also be referred to when necessary. As shown in FIGS. 2 and 5, the examples of operations are directed to switching control of the FCVCU 22 and the BATVCU 24 to the direct coupling state or the buck-boost state (the boost state) in acceleration driving, cruise driving, and deceleration driving of the FC vehicle 10. Thus, other controls will not be described.

First Example

In a first example (a first feature), in a case where the FC vehicle 10 sequentially performs acceleration driving, cruise driving, and deceleration driving with time, a situation where both the FCVCU 22 and the BATVCU 24 are in the direct coupling state is avoided by setting the BATVCU 24 in the direct coupling state and continuing a boost operation of the FCVCU 22 during cruise driving, and then canceling the direct coupling state of the BATVCU 24.

Specifically, in a timing chart shown in FIG. 2, during acceleration driving from time t0 to time t1, both the FCVCU 22 and the BATVCU 24 perform boost operation in order to supply power to the load 32 from both the BAT 20 and the FC 34. In this period, Vb>Vfc and Vinv>Vfc.

In FIG. 2, a band region between slender chain double-dashed lines vertically sandwiching a bold solid line indicating a load terminal voltage Vinv is a measurement error range of the voltage sensor 44. Specifically, as shown in FIG. 4A, the voltage sensor 44 has a measurement error (an error voltage) of ±Vinve with respect to the detected load terminal voltage Vinv (indicated by the bold solid line) along the ordinate.

On the other hand, in FIG. 2, a band region between slender broken lines sandwiching the bold dot-dash line indicating the FC power generation voltage Vfc is a measurement error range of the voltage sensor 36. In this case, as shown in FIG. 4A, the voltage sensor 36 has a measurement error (an error voltage) of ±Vfce with respect to the detected FC power generation voltage Vfc (indicated by the bold dot-dash line) along the ordinate.

Figure 3:
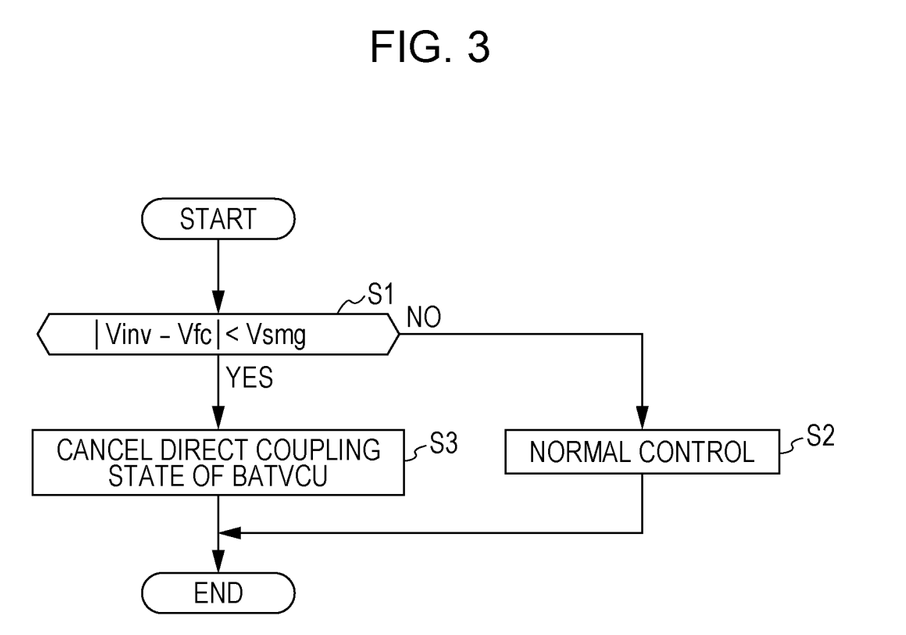
FIG. 3 is a flowchart of the first example shown in FIG. 2.
Figure 4A:
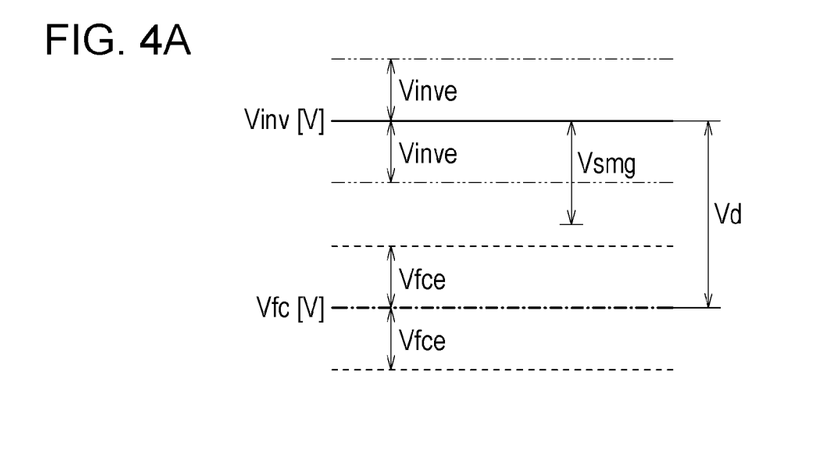
FIG. 4A shows a relationship between a load terminal voltage and an FC voltage.
Figure 4B:
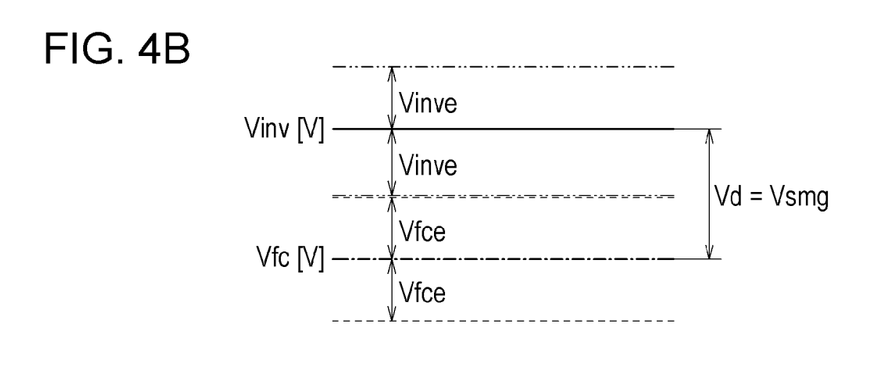
FIG. 4B shows the relationship between the load terminal voltage and the FC voltage.

During the period shown in the timing chart of FIG. 2, the ECU 26 repeatedly performs processes shown in a flowchart of FIG. 3.

Specifically, during the acceleration driving from time t0 to time t1, first, at step S1, the ECU 26 calculates the absolute value Vd (Vd=|Vinv−Vfc|, hereinafter also referred to as a "voltage difference Vd") of the difference between the load terminal voltage Vinv detected by the voltage sensor 44 and the FC power generation voltage Vfc detected by the voltage sensor 36.

Next, the ECU 26 determines whether the voltage difference Vd is less than a sensor margin voltage (an allowable voltage value) Vsmg. Here, as shown in FIG. 4B, the sensor margin voltage Vsmg is the sum of the error voltage Vinve of the voltage sensor 44 and the error voltage Vfce of the voltage sensor 36 (Vsmg=Vinve+Vfce).

As shown in FIGS. 2 and 4A, during the acceleration driving, the relationships of Vinv>Vfc and Vb>Vfc are established, and the voltage range from (Vinv−Vinve) to (Vinv+Vinve), which is the measurement error range of the voltage sensor 44, does not overlap the voltage range from (Vfc−Vfce) to (Vfc+Vfce), which is the measurement error range of the voltage sensor 36. Thus, the ECU 26 determines that the voltage difference Vd is greater than or equal to the sensor margin voltage Vsmg (Vd≥Vsmg, step S1: NO).

Consequently, at step S2, the ECU 26 selects a predetermined boost ratio for the FCVCU 22 and the BATVCU 24, and controls the FCVCU 22 and the BATVCU 24 such that the FCVCU 22 and the BATVCU 24 perform boost operation at the selected boost ratio (normal control). The normal control at step S2 refers to control performed by the ECU 26 and including the direct coupling state of the BATVCU 24.

Then, at time t1, the FC vehicle 10 shifts from the acceleration driving to cruise driving. During the cruise driving, the FC vehicle 10 runs at a constant vehicle velocity V, and thus, power supplied from the BAT 20 and the FC 34 to the load 32 can be reduced. Accordingly, the FCVCU 22 boosts the FC power generation voltage Vfc so as reduce FC generated power Pfc taken from the FC 34.

The BATVCU 24 reduces the load terminal voltage Vinv from time t1 to time t2, and directly couples the primary side 1Sb and the secondary side 2S to each other at time t2. When the BATVCU 24 comes to be in the direct coupling state, the switching element 24b is kept off and the switching element 24d is kept on. In this manner, stopping of the switching operation of the switching elements 24b and 24d can reduce a power loss in the BATVCU 24.

During the cruise driving, the processes shown in the flowchart of FIG. 3 are also repeated. In this case, from time t1 to time t3, in a manner similar to that in the acceleration driving, the ECU 26 repeats steps S1 and S2 because the measurement error range of the load terminal voltage Vinv and the measurement error range of the FC power generation voltage Vfc do not overlap each other.

Figure 4C:
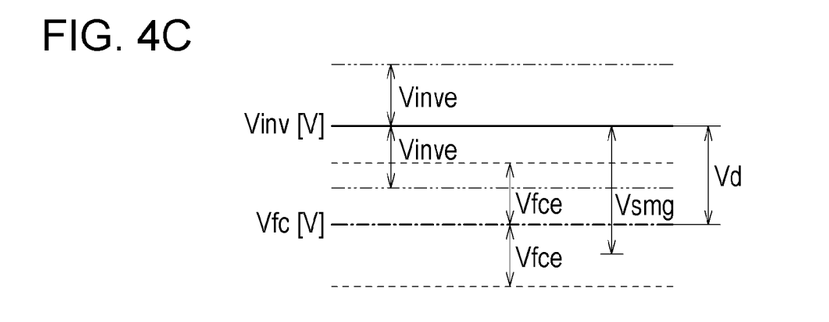
FIG. 4C shows the relationship between the load terminal voltage and the FC voltage.
Figure 5:
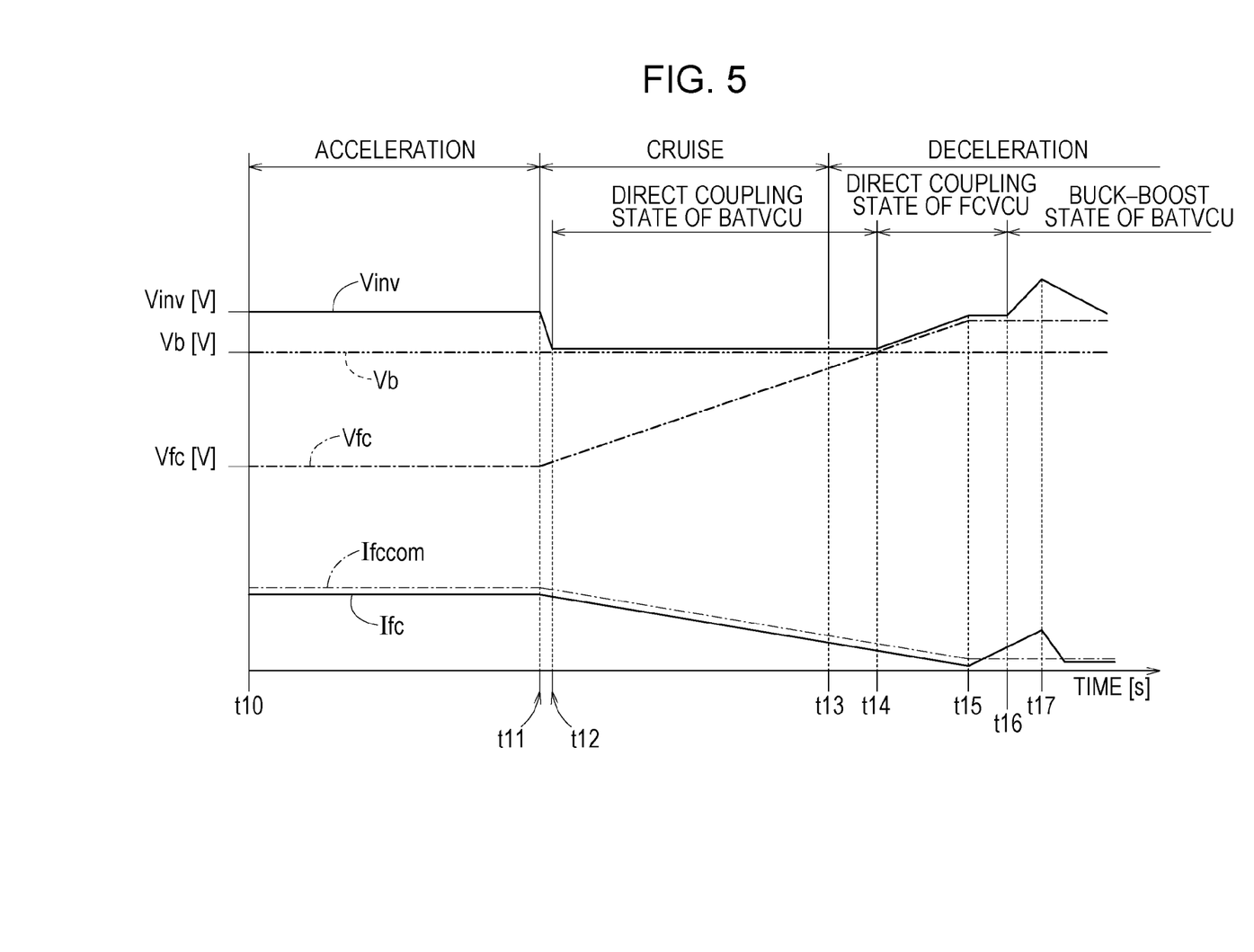
FIG. 5 is a timing chart of another operation (a second example) of the embodiment.

Thereafter, at time t3, as shown in FIGS. 2 and 4B, in a case where the lower limit of the measurement error range of the load terminal voltage Vinv substantially matches the upper limit of the measurement error range of the FC power generation voltage Vfc and the relationship of Vd≈Vsmg is established, the ECU 26 determines that continuation of the direct coupling state of the FCVCU 22 might cause the state of Vd<Vsmg shown in FIG. 4C and set both the FCVCU 22 and the BATVCU 24 in the direct coupling state so that control of the FC power generation voltage Vfc and the battery voltage Vb (load terminal voltage Vinv) can be failed (step S1: YES).

Then, at step S3, the ECU 26 cancels the direct coupling state of the BATVCU 24 and controls the BATVCU 24 such that switching operation of the switching elements 24b and 24d is restarted.

In this manner, from time t3 to time t4, the ECU 26 selects a boost ratio with which the state of substantial matching between the lower limit of the measurement error range of the load terminal voltage Vinv and the upper limit of the measurement error range of the FC power generation voltage Vfc shown in FIG. 4B (i.e., Vd≈Vsmg) can be maintained, and controls the FCVCU 22 and the BATVCU 24 such that the FCVCU 22 and the BATVCU 24 perform boost operation at the selected boost ratio. Consequently, at time t4, even when the FC vehicle 10 shifts from the cruise driving to deceleration driving, the ECU 26 can cause the FCVCU 22 and the BATVCU 24 to execute boost operation while maintaining the state of Vd Vsmg.

When the FC power generation voltage Vfc is boosted so that the difference (the voltage difference Vd) between the FC power generation voltage Vfc and the load terminal voltage Vinv decreases, the FCVCU 22 only slightly boosts the FC power generation voltage Vfc in a high voltage region (a low load region) because of the IV characteristics (not shown), and it becomes difficult to control FC generated power Pfc.

During the deceleration driving, the processes shown in the flowchart of FIG. 3 are repeated. In this case, after time t4, the ECU 26 repeats steps S1 and S3. In this manner, the load terminal voltage Vinv and the FC power generation voltage Vfc are boosted from time t4 to time t5 with the relationship of Vd≈Vsmg maintained, and after time t5, the load terminal voltage Vinv and the FC power generation voltage Vfc are kept constant. Thus, during the deceleration driving, it is also possible to avoid a situation where both the FCVCU 22 and the BATVCU 24 are in the direct coupling state.

In the deceleration driving, the BAT 20 takes regenerated power of the load 32 through the BATVCU 24, and takes power from the FC 34 through the BATVCU 24. In this manner, the charged amount (SOC) of the BAT 20 is increased.

Second Example

In a second example (a second feature), in a case where the FC vehicle 10 sequentially performs acceleration driving, cruise driving, and deceleration driving with time, if the BATVCU 24 is set in the direct coupling state and boost operation of the FCVCU 22 continues in the cruise driving and then both the FCVCU 22 and the BATVCU 24 are temporarily set in the direct coupling state during the deceleration driving so that an FC generated current Ifc does not follow an FC generated current command value Ifccom that is a command current (a target current) of the FC generated current Ifc (i.e., the FC generated current Ifc is out of control), the direct coupling state of the BATVCU 24 is canceled. That is, in the second example, in order to further reduce a power loss of the FC system 12, the FCVCU 22 and the BATVCU 24 are temporarily set in the direct coupling state on purpose.

Specifically, in a timing chart shown in FIG. 5, during the acceleration driving from time t10 to time t11, both the FCVCU 22 and the BATVCU 24 perform boost operation in order to supply power from both the BAT 20 and the FC 34 to the load 32. In this period, Vb>Vfc, Vinv>Vfc, and an FC generated current Ifc follows an FC generated current command value Ifccom.

Figure 6:
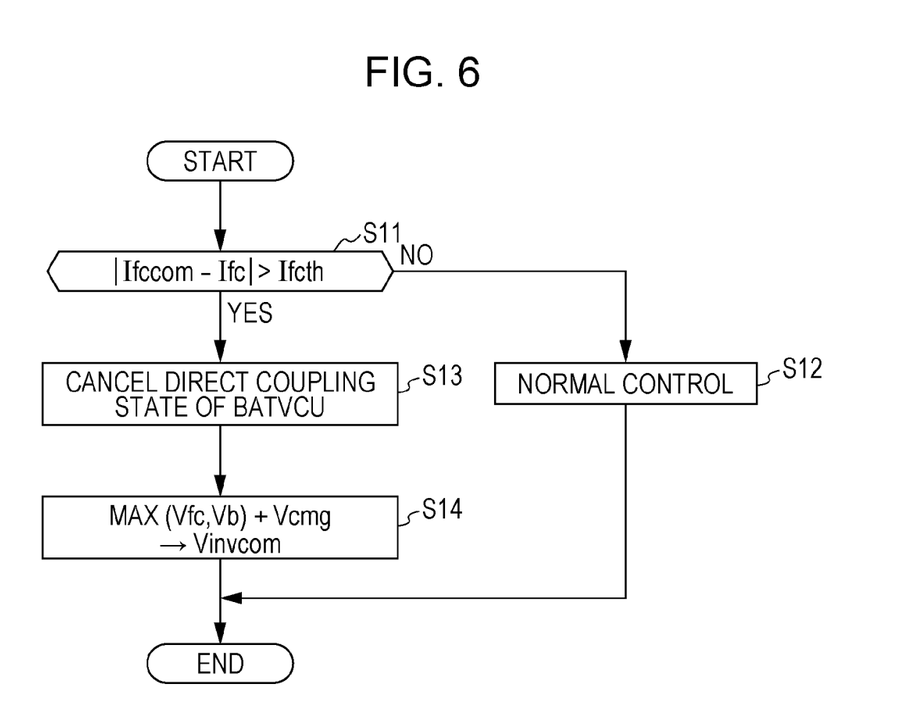
FIG. 6 is a flowchart of a second example shown in FIG. 5.

During the period shown in the timing chart of FIG. 5, the ECU 26 repeatedly performs processes shown in a flowchart of FIG. 6.

Specifically, during the acceleration driving from time t10 to time t11, first, at step S11, the ECU 26 calculates the absolute value Id (Id=|Ifccom−Ifc|, hereinafter also referred to as a "current difference Id") of the difference between the FC generated current command value Ifccom and the FC generated current Ifc detected by the current sensor 38.

Next, the ECU 26 determines whether the current difference Id exceeds an allowable current value Ifcth. Here, the allowable current value Ifcth is the upper limit of an allowable range in which the FC generated current Ifc can be determined to follow the FC generated current command value Ifccom.

In this case, as shown in FIG. 5, during the acceleration driving, since Ifc≈Ifccom, the ECU 26 determines that the FC generated current Ifc follows the FC generated current command value Ifccom (Id≤Ifcth, step S11: NO).

Consequently, at step S12, the ECU 26 selects a predetermined boost ratio for the FCVCU 22 and the BATVCU 24, and controls the FCVCU 22 and the BATVCU 24 such that the FCVCU 22 and the BATVCU 24 perform boost operation at the selected boost ratio (normal control). The normal control at step S12 refers to control performed by the ECU 26 and including the direct coupling state of the BATVCU 24.

Then, at time t11, the FC vehicle 10 shifts from the acceleration driving to the cruise driving. During the cruise driving, the FC vehicle 10 runs at a constant vehicle velocity V, and thus, power supplied from the BAT 20 and the FC 34 to the load 32 can be reduced. Thus, the FCVCU 22 boosts the FC power generation voltage Vfc so as to reduce FC generated power Pfc taken from the FC 34. Accordingly, the FC generated current command value Ifccom decreases with time, and the FC generated current Ifc decreases in accordance with the FC generated current command value Ifccom.

The BATVCU 24 reduces the load terminal voltage Vinv from time t11 to time t12, and directly couples the primary side 1Sb and the secondary side 2S to each other at time t12. When the BATVCU 24 comes to be in the direct coupling state, the switching element 24b is kept off and the switching element 24d is kept on. Thus, switching operations of the switching elements 24b and 24d are stopped. As result, it is possible to reduce a power loss in the BATVCU 24.

During the cruise driving, the processes shown in the flowchart of FIG. 6 are also repeated. In this case, from time t12 to time t13, in a manner similar to that in the acceleration driving, the ECU 26 repeats steps S11 and S12 because the FC generated current Ifc follows the FC generated current command value Ifccom.

At time t13, when the FC vehicle 10 shifts from the cruise driving to the deceleration driving, the BATVCU 24 maintains its direct coupling state where the FCVCU 22 maintains the boost state from time t13 to time t14 in the same manner as in the cruise driving. During the deceleration driving, the ECU 26, of course, repeats the processes shown in FIG. 6.

Thereafter, at time t14, when the load terminal voltage Vinv substantially matches the FC power generation voltage Vfc (Vfc≈Vinv=Vb) and both the FCVCU 22 and the BATVCU 24 come to be in the direct coupling state, the FCVCU 22 and the BATVCU 24 stop switching operation. Thus, the ECU 26 cannot control the FC power generation voltage Vfc, the battery voltage Vb, and the load terminal voltage Vinv (i.e., these voltages are out of control). As a result, from time t14 to time t15, the FC power generation voltage Vfc and the load terminal voltage Vinv boost.

The direct coupling state of both the FCVCU 22 and the BATVCU 24 can further reduce the power loss. In the period from time t14 to time t15, even when both the FCVCU 22 and the BATVCU 24 come to be in the direct coupling state and the FC power generation voltage Vfc, the battery voltage Vb, and the load terminal voltage Vinv are out of control, the FC generated current Ifc decreases in accordance with the FC generated current command value Ifccom.

Thereafter, in the period from time t15 to time t16, in a case were both the FCVCU 22 and the BATVCU 24 maintain the direct coupling state and the load terminal voltage Vinv is kept constant, the FC generated current command value Ifccom slightly decreases with time, whereas the FC generated current Ifc increases with time.

At time t16, if the current difference Id exceeds an allowable current value Ifcth (Id>Ifcth, step S11: YES), the ECU 26 determines that continuation of the direct coupling state of the FCVCU 22 and the BATVCU 24 causes the FC generated current Ifc not to follow the FC generated current command value Ifccom.

Then, at step S13, the ECU 26 cancels the direct coupling state of the BATVCU 24, and controls the BATVCU 24 such that switching elements 24b and 24d perform switching operation again.

Figure 7:
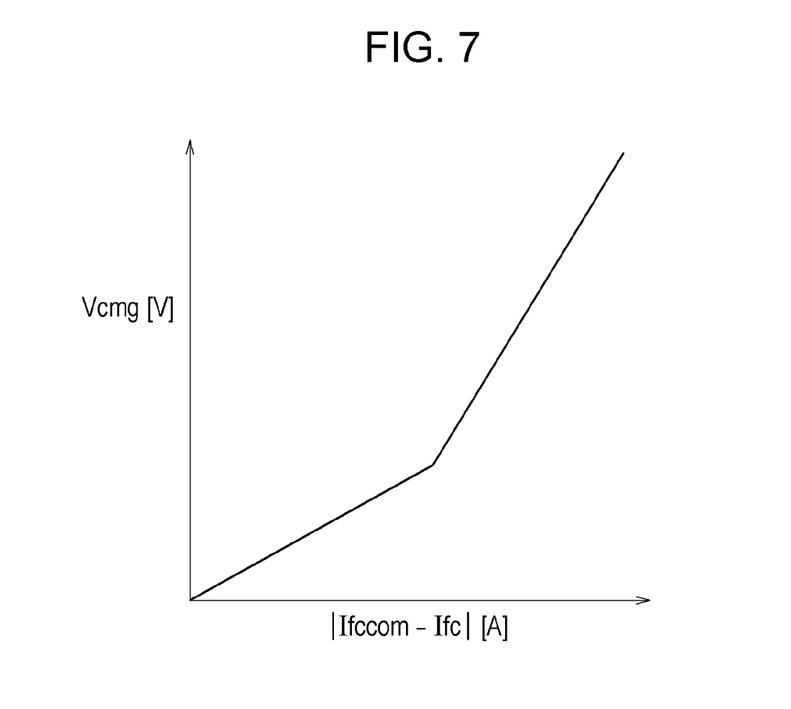
FIG. 7 is a map showing a relationship between a current difference for use in process of step S14 in the flowchart of FIG. 6 and a control error margin voltage.

In this case, at step S14, the ECU 26 refers to a map shown in FIG. 7, and specifies a control error margin voltage Vcmg in accordance with the current difference Id. The control error margin voltage Vcmg refers to an allowable value of the control error of the load terminal voltage Vinv by the BATVCU 24.

The ECU 26 sets the sum of a higher one of the FC power generation voltage Vfc or the battery voltage Vb and the control error margin voltage Vcmg as a load terminal command voltage Vinvcom (Vinvcom=MAX (Vfc, Vb)+Vcmg), and controls the BATVCU 24 such that the BATVCU 24 performs boost operation with a boost ratio in accordance with the load terminal command voltage Vinvcom.

Specifically, in a case where boost operation is performed by cancelling the direct coupling state of the BATVCU 24, a small difference between the FC power generation voltage Vfc and the load terminal voltage Vinv reduces controllability of the load terminal voltage Vinv. Immediately after cancelling the direct coupling state, the current difference Id is large and controllability over the FC generated current Ifc is low. In view of this, controllability over the load terminal voltage Vinv is intended to be increased by maximizing the load terminal command voltage Vinvcom and controlling the BATVCU 24 so as to increase the load terminal voltage Vinv.

In this manner, from time t16 to time t17, the load terminal voltage Vinv increases because of boost operation of the BATVCU 24. As a result, after time t17, the FC generated current Ifc changes in accordance with the FC generated current command value Ifccom. Specifically, after time t16, the ECU 26 causes the BATVCU 24 to execute boost operation by feedback control for changing the FC generated current Ifc in accordance with the FC generated current command value Ifccom.

From time t14 to time t16, none of the FC power generation voltage Vfc, the battery voltage Vb, and the load terminal voltage Vinv is under control. Thus, at step S14, the ECU 26 sets the sum of a higher one of the FC power generation voltage Vfc or the battery voltage Vb and the control error margin voltage Vcmg as the load terminal command voltage Vinvcom.

Advantages of Embodiment

As described above, in the FC vehicle 10 and the FC system 12 of this embodiment, when the absolute value (the voltage difference Vd) of the difference between the load terminal voltage Vinv of the secondary side 2S and the FC power generation voltage Vfc of the primary side 1Sb in the BATVCU 24 is less than the sensor margin voltage Vsmg or when the absolute value (the current difference Id) of the difference between the FC generated current Ifc flowing from the FC 34 to the FCVCU 22 and the FC generated current command value Ifccom exceeds the allowable current value Ifcth, the ECU 26 switches the BATVCU 24 from the direct coupling state to the buck-boost state.

That is, this embodiment has two features.

The first feature (the first example) is that the BATVCU 24 is switched from the direct coupling state to the buck-boost state when the voltage difference Vd is less than the sensor margin voltage Vsmg (Vd<Vsmg). Thus, it is possible to prevent both the FCVCU 22 and the BATVCU 24 from coming to be in the direct coupling state.

In this manner, in consideration of the FC power generation voltage Vfc, the load terminal voltage Vinv (the battery voltage Vb when the BATVCU 24 is in the direct coupling state) and the sensor margin voltage Vsmg, the ECU 26 performs feedforward control (switching control from the direct coupling state to the buck-boost state) on the BATVCU 24. As a result, it is possible to control both the FC power generation voltage Vfc and the battery voltage Vb stably. In addition, since the BATVCU 24 is in the direct coupling state before switching to the buck-boost state, a power loss of the entire FC system 12 can be reduced.

On the other hand, the second feature (the second example) is that the BATVCU 24 is switched from the direct coupling state to the buck-boost state when the current difference Id exceeds the allowable current value Ifcth (Id>Ifcth).

Specifically, in a case where both the FCVCU 22 and the BATVCU 24 are temporarily in the direct coupling state, when the current difference Id exceeds the allowable current value Ifcth and the FC generated current Ifc cannot follow the allowable current value Ifcth, it is determined that the FC generated current Ifc (the FC generated power Pfc) is out of control, and the BATVCU 24 is switched to the buck-boost state.

In this manner, both the FCVCU 22 and the BATVCU 24 continue the direct coupling state until the FC generated power Pfc becomes out of control, and thus, the time region of the direct coupling state is enlarged. That is, as compared to the period from t2 to t3 in FIG. 2, the time region is enlarged to the period from t12 to t14 in FIG. 5, and a power loss can be further reduced.

As described above, in this embodiment, the first feature can minimize the possibility that both the FCVCU 22 and the BATVCU 24 come to be in the direct coupling state, thereby stably controlling the FC power generation voltage Vfc, the battery voltage Vb, and the load terminal voltage Vinv while reducing a power loss.

In addition, in this embodiment, the second feature continues the direct coupling state until the FC generated power Pfc becomes out of control even when both the FCVCU 22 and the BATVCU 24 come to be temporarily in the direct coupling state, thereby further reducing the power loss.

In this manner, in this embodiment, the first feature and the second feature can enhance the market appeal of the FC system 12. In addition, in this embodiment, the FC system 12 is installed in the FC vehicle 10, and the load 32 includes the motor 14. Thus, the market appeal of the FC vehicle 10 can be enhanced.

With respect to the first feature, the ECU 26 switches the BATVCU 24 from the direct coupling state to the buck-boost state while maintaining the FCVCU 22 in the boost state, and then when the voltage difference Vd becomes less than the sensor margin voltage Vsmg, the ECU 26 switches the BATVCU 24 from the buck-boost state to the direct coupling state. In this manner, it is ensured to prevent both the FCVCU 22 and the BATVCU 24 from coming to the direct coupling state, and stability of control of the FC power generation voltage Vfc, the battery voltage Vb, and the load terminal voltage Vinv can be obtained.

In addition, since the sensor margin voltage Vsmg is the sum of the measurement error of the voltage sensor 36 that detects the FC power generation voltage Vfc and the measurement error of the voltage sensor 44 that detects the load terminal voltage Vinv, it is possible to accurately determine whether the voltage difference Vd becomes less than the sensor margin voltage Vsmg, and the BATVCU 24 can be appropriately and efficiently switched from the buck-boost state to the direct coupling state.

With respect to the second feature, the ECU 26 switches the BATVCU 24 from the buck-boost state to the direct coupling state while maintaining the FCVCU 22 in the boost state, and then switches the FCVCU 22 from the buck-boost state to the direct coupling state while maintaining the BATVCU 24 in the direct coupling state. Furthermore, when the current difference Id exceeds the allowable current value Ifcth, at least the BATVCU 24 is switched from the direct coupling state to the buck-boost state. In this case, both the FCVCU 22 and the BATVCU 24 come to be temporarily in the direct coupling state. However, when the current difference Id exceeds the allowable current value Ifcth, at least the BATVCU 24 is switched to the buck-boost state. In this manner, the time region of the direct coupling state can be easily enlarged, thereby further reducing the power loss.

At time t16 in FIG. 5, in switching the BATVCU 24 from the direct coupling state to the buck-boost state, the FCVCU 22 may be kept in the direct coupling state or may be switched to the boost state.

In a case where the BATVCU 24 is switched from the direct coupling state to the buck-boost state, the ECU 26 sets the sum of a higher one of the FC power generation voltage Vfc or the battery voltage Vb and the control error margin voltage Vcmg as the load terminal command voltage Vinvcom. That is, in a case where the FC generated current Ifc does not follow the FC generated current command value Ifccom, the controllability over the FC generated current Ifc has decreased. In view of this, the control error margin voltage Vcmg is added to a higher one of the FC power generation voltage Vfc or the battery voltage Vb and the obtained sum is set as the load terminal command voltage Vinvcom. Then, the battery voltage Vb can be quickly booted after switching of the BATVCU 24 from the direct coupling state to the buck-boost state, and stability of control over the FC generated current Ifc (the FC generated power Pfc) can be quickly obtained.

The present disclosure is not limited to the foregoing embodiment, and may take various configurations based on the description of the present application.

The present application describes a power supply system including: a fuel cell that outputs a fuel cell voltage; a power storage device that outputs a power storage device voltage; a load; a first voltage adjusting device that adjusts the fuel cell voltage and applies the adjusted fuel cell voltage to the load; a second voltage adjusting device that adjusts the power storage device voltage and applies the adjusted power storage device voltage to the load; and a controller that controls the first voltage adjusting device and the second voltage adjusting device, and a fuel cell vehicle to which the power supply system is applied.

In the present application, when an absolute value of a difference between a secondary voltage at the load in the second voltage adjusting device and the fuel cell voltage is less than a predetermined allowable voltage value or when an absolute value of a difference between a fuel cell current flowing from the fuel cell into the first voltage adjusting device and a command value of the fuel cell current exceeds a predetermined allowable current value, the controller switches the second voltage adjusting device from a direct coupling state to a voltage adjusting state.

That is, the present application has two features.

The first feature is that when the absolute value of the difference between the secondary voltage and the fuel cell voltage is less than the allowable voltage value, the second voltage adjusting device is switched from the direct coupling state to the voltage adjusting state. Thus, it is possible to avoid a situation where both the first voltage adjusting device and the second voltage adjusting device are in the direct coupling state. As described above, in consideration of the fuel cell voltage, the secondary voltage (the power storage device voltage when the second voltage adjusting device is in the direct coupling state), and the allowable voltage value, feedforward control (switching control from the direct coupling state to the voltage adjusting state) is performed on the second voltage adjusting device. Thus, both the fuel cell voltage and the power storage device voltage can be stably controlled. In addition, since the second voltage adjusting device is in the direct coupling state before being switched to the voltage adjusting state, a power loss in the entire the power supply system can be reduced.

The second feature is that when the absolute value of the difference between the fuel cell current and the command value of the fuel cell current exceeds the allowable current value, the second voltage adjusting device is switched from the direct coupling state to the voltage adjusting state. Specifically, in a case where both the first voltage adjusting device and the second voltage adjusting device are temporarily in the direct coupling state, when the absolute value exceeds the allowable current value and the fuel cell current cannot follow the command value, it is determined that the fuel cell current (fuel cell power) is out of control, and the second voltage adjusting device is switched to the voltage adjusting state. In this manner, both the first voltage adjusting device and the second voltage adjusting device continue to be in the direct coupling state until the state in which the fuel cell power is out of control is detected. Thus, the time region of the direct coupling state is enlarged, thereby further reducing the power loss.

As described above, in the present application, the first feature minimizes the possibility that both the first voltage adjusting device and the second voltage adjusting device are in the direct coupling state, thereby reducing a power loss and stably controlling the fuel cell voltage and the power storage device voltage.

In the present application, the second feature causes the direct coupling state to continue until the fuel cell power becomes out of control even in a case where both the first voltage adjusting device and the second voltage adjusting device come to be temporarily in the direct coupling state. Thus, the power loss can be further reduced.

As described above, in the present application, the first feature and the second feature can enhance the market appeal of the power supply system. In addition, in the present application, the power supply system is included in the fuel cell vehicle and the load includes a driving motor. Thus, the market appeal of the fuel cell vehicle can also be enhanced.

The first feature will be more specifically described.

Preferably, after the controller has switched the second voltage adjusting device from the voltage adjusting state to the direct coupling state while maintaining the first voltage adjusting device in a voltage adjusting state, the controller switches the second voltage adjusting device from the direct coupling state to the voltage adjusting state when the absolute value of the difference between the secondary voltage and the fuel cell voltage is less than the allowable voltage value. Then, it is ensured to prevent both the first voltage adjusting device and the second voltage adjusting device from coming to be in the direct coupling state, thereby obtaining stability of control over the fuel cell voltage and the power storage device voltage.

The power supply system preferably includes: a first voltage sensor that detects the fuel cell voltage; and a second voltage sensor that detects the secondary voltage, and the allowable voltage value is preferably a sum of a measurement error of the first voltage sensor and a measurement error of the second voltage sensor. Thus, it is possible to accurately determine whether the absolute value of the difference between the secondary voltage and the fuel cell voltage becomes less than the allowable voltage value, the second voltage adjusting device can be appropriately and efficiently switched from the voltage adjusting state to the direct coupling state.

Then, the second feature will be more specifically described.

Preferably, after the controller has switched the second voltage adjusting device from the voltage adjusting state to the direct coupling state while maintaining the first voltage adjusting device in a voltage adjusting state, the controller switches the first voltage adjusting device from the voltage adjusting state to a direct coupling state while maintaining the second voltage adjusting device in the direct coupling state, and the controller switches at least the second voltage adjusting device from the direct coupling state to the voltage adjusting state when the absolute value of the difference between the fuel cell current and the command value exceeds the allowable current value. In this case, although both the first voltage adjusting device and the second voltage adjusting device come to be temporarily in the direct coupling state, at least the second voltage adjusting device is switched to the voltage adjusting state when the absolute value of the difference between the fuel cell current and the command value exceeds the allowable current value. Then, the time region of the direct coupling state can be easily enlarged, thereby further reducing the power loss.

Preferably, in a case where the controller switches the second voltage adjusting device from the direct coupling state to the voltage adjusting state, the controller sets a sum of either the fuel cell voltage or the power storage device voltage and an allowable value of a control error of the secondary voltage at a command value of the secondary voltage. That is, in a case where the fuel cell current does not follow the command value of the fuel cell current, controllability over the fuel cell current has decreased. In view of this, the allowable value is added to the fuel cell voltage or the power storage device voltage and the sum is set at the command value of the secondary voltage. Thus, after the second voltage adjusting device has been switched from the direct coupling state to the voltage adjusting state, the power storage device voltage is quickly boosted, and stability of control over the fuel cell current can be quickly obtained.

Preferably, in the present application, the first voltage adjusting device is a boost converter that boosts the fuel cell voltage to a secondary voltage and applies the secondary voltage to the load, and when the absolute value of the difference between the secondary voltage of the second voltage adjusting device and the fuel cell voltage is less than the allowable voltage value or when the absolute value of the difference between the fuel cell current and the command value exceeds the allowable current value, the controller switches the second voltage adjusting device from the direct coupling state to a boost state.

In the present application, the possibility that both the first voltage adjusting device and the second voltage adjusting device are in the direct coupling state is minimized, thereby reducing a power loss and stably controlling the fuel cell voltage and the power storage device voltage.

In addition, in the present application, even in a case where both the first voltage adjusting device and the second voltage adjusting device are temporarily in the direct coupling state, the direct coupling state is continued until fuel cell power becomes out of control, thereby further reducing the power loss.

As a result, in the present application, the market appeal of the power supply system can be enhanced. Furthermore, in the present application, the power supply system is included in the fuel cell vehicle, and a driving motor is included in the load. Thus, the market appeal of the fuel cell vehicle can also be enhanced.

Obviously, numerous modifications and variations of the present invention are possible in light of the above teachings. It is therefore to be understood that within the scope of the appended claims, the invention may be practiced otherwise than as specifically described herein.

What is claimed is:
1. A power supply system comprising:
a fuel cell that outputs a fuel cell voltage;
a power storage device that outputs a power storage device voltage;
a load;
a first voltage adjusting device that adjusts the fuel cell voltage and applies the adjusted fuel cell voltage to the load;
a second voltage adjusting device that adjusts the power storage device voltage and applies the adjusted power storage device voltage to the load; and
a controller that controls the first voltage adjusting device and the second voltage adjusting device, wherein
when an absolute value of a difference between a secondary voltage at the load in the second voltage adjusting device and the fuel cell voltage is less than a predetermined allowable voltage value or when an absolute value of a difference between a fuel cell current flowing from the fuel cell into the first voltage adjusting device and a command value of the fuel cell current exceeds a predetermined allowable current value, the controller switches the second voltage adjusting device from a direct coupling state to a voltage adjusting state.

2. The power supply system according to claim 1, wherein after the controller has switched the second voltage adjusting device from the voltage adjusting state to the direct coupling state while maintaining the first voltage adjusting device in a voltage adjusting state,
the controller switches the second voltage adjusting device from the direct coupling state to the voltage adjusting state when the absolute value of the difference between the secondary voltage and the fuel cell voltage is less than the allowable voltage value.

3. The power supply system according to claim 1, further comprising:
a first voltage sensor that detects the fuel cell voltage; and
a second voltage sensor that detects the secondary voltage, wherein
the allowable voltage value is a sum of a measurement error of the first voltage sensor and a measurement error of the second voltage sensor.

4. The power supply system according to claim 1, wherein after the controller has switched the second voltage adjusting device from the voltage adjusting state to the direct coupling state while maintaining the first voltage adjusting device in a voltage adjusting state,
the controller switches the first voltage adjusting device from the voltage adjusting state to a direct coupling state while maintaining the second voltage adjusting device in the direct coupling state, and
the controller switches at least the second voltage adjusting device from the direct coupling state to the voltage adjusting state when the absolute value of the difference between the fuel cell current and the command value exceeds the allowable current value.

5. The power supply system according to claim 4, wherein in a case where the controller switches the second voltage adjusting device from the direct coupling state to the voltage adjusting state, the controller sets a sum of either the fuel cell voltage or the power storage device voltage and an allowable value of a control error of the secondary voltage at a command value of the secondary voltage.

6. The power supply system according to claim 1, wherein the first voltage adjusting device is a boost converter that boosts the fuel cell voltage to a secondary voltage and applies the secondary voltage to the load, and
when the absolute value of the difference between the secondary voltage of the second voltage adjusting device and the fuel cell voltage is less than the allowable voltage value or when the absolute value of the difference between the fuel cell current and the command value exceeds the allowable current value, the controller switches the second voltage adjusting device from the direct coupling state to a boost state.

7. A fuel cell vehicle comprising:
the power supply system according to claim 1; and
a driving motor included in the load of the power supply system.

8. A power supply system comprising:
a fuel cell to output a fuel cell voltage;
a power storage device to output a power storage device voltage;
a first voltage adjusting device to adjust the fuel cell voltage to generate an adjusted fuel cell voltage to be applied to a load;
a second voltage adjusting device having a direct coupling state and a voltage adjusting state, the power storage device voltage being adjusted to generate an adjusted power storage device voltage to be applied to the load in the voltage adjusting state, the power storage device voltage being applied to the load without adjusting the power storage device voltage in the direct coupling state; and
a controller to control the first voltage adjusting device and the second voltage adjusting device, the controller being to switch the second voltage adjusting device from the direct coupling state to the voltage adjusting state in a case where a first absolute value of a first difference between a secondary voltage of the second voltage adjusting device applied across the load and the fuel cell voltage is less than a predetermined allowable voltage value or in a case where a second absolute value of a second difference between a fuel cell current being to flow from the fuel cell into the first voltage adjusting device and a target current value of the fuel cell current exceeds a predetermined allowable current value.

9. The power supply system according to claim 8,
wherein the first voltage adjusting device has a first voltage adjusting state in which the fuel cell voltage is adjusted to generate the adjusted fuel cell voltage to be applied to the load, and
wherein after the controller has switched the second voltage adjusting device from the voltage adjusting state to the direct coupling state while maintaining the first voltage adjusting device in the first voltage adjusting state, the controller switches the second voltage adjusting device from the direct coupling state to the voltage adjusting state in a case where the first absolute value of the first difference between the secondary voltage and the fuel cell voltage is less than the predetermined allowable voltage value.

10. The power supply system according to claim 8, further comprising:
a first voltage sensor to detect the fuel cell voltage; and
a second voltage sensor to detect the secondary voltage,
wherein the predetermined allowable voltage value is a sum of a measurement error of the first voltage sensor and a measurement error of the second voltage sensor.

11. The power supply system according to claim 8,
wherein the first voltage adjusting device has a first voltage adjusting state in which the fuel cell voltage is adjusted to generate the adjusted fuel cell voltage to be applied to the load,
wherein the first voltage adjusting device has a first direct coupling state in which the fuel cell voltage is applied to the load without adjusting the fuel cell voltage,
wherein after the controller has switched the second voltage adjusting device from the voltage adjusting state to the direct coupling state while maintaining the first voltage adjusting device in the first voltage adjusting state, the controller switches the first voltage adjusting device from the first voltage adjusting state to the first direct coupling state while maintaining the second voltage adjusting device in the direct coupling state, and
wherein the controller switches at least the second voltage adjusting device from the direct coupling state to the voltage adjusting state in a case where the second absolute value of the second difference between the fuel cell current and the target current value exceeds the predetermined allowable current value.

12. The power supply system according to claim 11, wherein in a case where the controller switches the second voltage adjusting device from the direct coupling state to the voltage adjusting state, the controller sets a sum of either the fuel cell voltage or the power storage device voltage and an allowable value of a control error of the secondary voltage at a target voltage value of the secondary voltage.

13. The power supply system according to claim 8,
wherein the first voltage adjusting device includes a boost converter and has a boost state,
wherein the boost converter boosts the fuel cell voltage to a first secondary voltage and applies the first secondary voltage to the load in the boost state, and
wherein in a case where the first absolute value of the first difference between the secondary voltage of the second voltage adjusting device and the fuel cell voltage is less than the predetermined allowable voltage value or in a case where the second absolute value of the second difference between the fuel cell current and the target current value exceeds the predetermined allowable current value, the controller switches the second voltage adjusting device from the direct coupling state to the boost state.

14. The power supply system according to claim 8, further comprising the load.

15. A fuel cell vehicle comprising:
the power supply system according to claim 14; and
a driving motor included in the load of the power supply system.

* * * * *